UNITED STATES PATENT OFFICE.

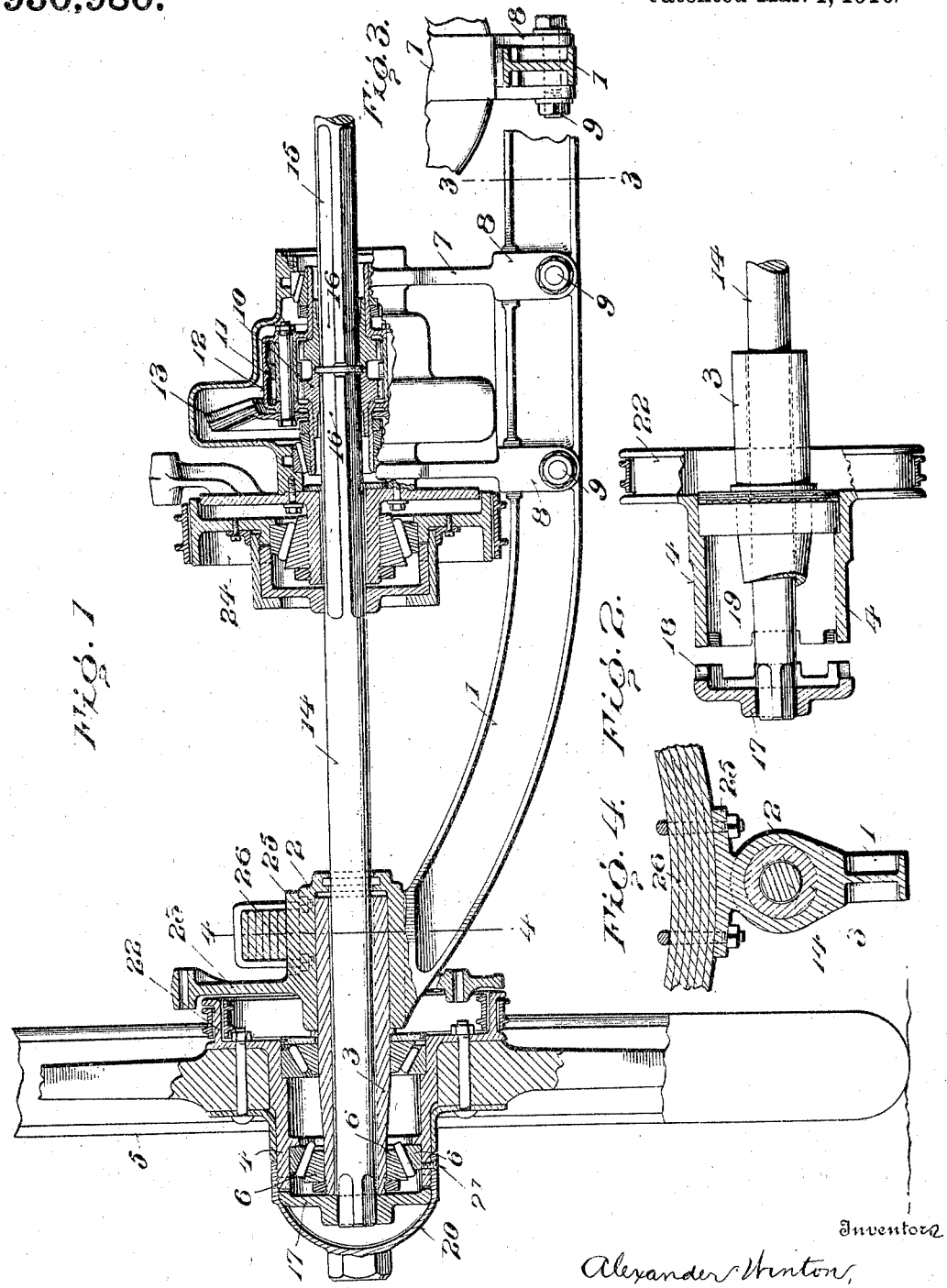

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

DRIVING MECHANISM FOR MOTOR-VEHICLES.

950,980.  Specification of Letters Patent.  Patented Mar. 1, 1910.

Application filed November 30, 1906. Serial No. 345,691.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Driving Mechanism for Motor-Vehicles, of which the following is a specification, reference being had therein to the accompanying drawing.

This invention relates to improvements in driving mechanism for motor vehicles, and pertains to a construction whereby a solid rear axle may be utilized in contra-distinction to the usual tubular rear axle.

This invention is particularly intended for the driving mechanism of a motor propelled touring car, the primary object of which is the provision of a solid rear axle preferably of the "drop-type", which carries at its center the compensating gear, and at its end the propelling wheels, whereby increased strength is obtained, and facility of access to the parts over the usual tubular rear axle is acquired.

In the accompanying drawings, Figure 1, is a sectional view of the improved driving mechanism, showing the compensating gear, and one of the driving wheels, together with the solid axle, and the mechanism connecting the driving wheel and the compensating gear. Fig. 2, is a detached sectional view showing the detailed construction of the parts connecting the outer end of the driving shaft with the hub of the driving wheel. Fig. 3, is a sectional view on the line 3—3 of Fig. 1. Fig. 4, is a sectional view on the line 4—4 of Fig. 1.

Referring now to the drawings, by reference characters, 1 is a solid axle which has integral therewith at each end a socket 2. Since the two ends of the axle 1 are alike, both ends of the axle are not shown, in order that a drawing upon a sufficiently large scale to show clearly the construction of the several parts may be used. Attached firmly to these sockets 2 are the hollow wheel-spindles or axles 3. Carried upon the wheel-spindles and the interior of the hub 4 of the wheel 5, are preferably roller bearings 6 by means of which the driving wheel is journaled upon the tubular spindle.

Preferably, the solid axle is of the drop-type, and of I-form, in cross-section, and which, as will be readily understood, affords a continuous unbroken rear axle of great strength and rigidity, as compared to the usual tubular rear axle, and does not therefore require any spanning or truss members at its center for spanning the compensating gears, as does the usual form and arrangement of tubular axle.

A separate housing 7 for the compensating gears is provided, and this housing has extending parallel ears 8 which embrace the sides and upper edge of the axle 1, and transverse bolts 9 serve to firmly connect the compensating gear-housing to the solid axle. The upward or lateral curve of the ends of the axle is sufficient to bring the center or axis of the socket 2 in a line with the center or axis of the said housing and gearing contained therein. The compensating gearing may be of any desired form. The form here shown consists of the master gears 10 in mesh with the pinions 11, the pinions 11 being journaled in an auxiliary housing 12, and this housing 12 carries a beveled gear 13, with which a beveled gear upon the engine-driven shaft meshes. The engine-driven shaft and beveled gear are not here shown, and are not necessary to the understanding of the present invention, since any desired form of compensating gear and driving mechanism therefor, may be used, the only requirement being that there shall be master gears in the compensating mechanism, which have their axes concentric with the axis of the socket 2.

There are provided two separate wheel-driving shafts 14 and 15, the inner ends of these shafts being formed to connect with the master gears 10 of the compensating mechanism. As here shown, this connection is afforded by forming the inner ends of the axles 14 and 15 with angular or flat portions 16, which will engage or interlock with correspondingly-shaped portions of the hub of the master gear 10 in such a manner that the shafts may be readily inserted into the hubs of these gears and readily removed therefrom. The outer end of these shafts 14 and 15 are shaped in a manner to interlock with a clutch member 17, and this clutch member has jaws 18 which enter recesses 19 formed in the hubs 4 of the driving wheels. These clutch members 17 are held in position by means of a hub-cap 20 which screws onto the said hub and engages the clutch member 17. In order to prevent the unscrewing of the hub-caps, any desired device may be used, such as a screw 21 passing through the cap into the hub.

From the foregoing, it will be observed that the clutch member 17 serves to lock the outer end of the shafts to the driving wheel hub.

The arrangement of the brake-flange 22; the flange 23 formed on the end of the axle 1; and the arrangement of the braking mechanism 24 adjacent the compensating gear-housing 7, is not herein specifically described or claimed, since these form in part the subject-matter of our concurrently pending application, Ser. No. 341,268 filed October 30th, 1906.

The socket members 2 of the solid shaft 1 have their inner portions formed into spring-seats 25 and receive the springs 26 in addition to receiving and supporting the tubular wheel-spindles 3.

By reason of the integral arrangement of the spindle sockets, and the transversely-arranged sockets 8 by means of which the compensating gear housing is attached to the axle, it is impossible for these parts to twist out of line when under sudden strain.

Having thus described our invention, what we claim and desire to secure by Letters Patent, is:—

A driving and supporting mechanism for motor vehicles, comprising a single piece axle having an integral drop center and short integral longitudinally extending spindle sockets to prevent possible shifting out of alinement, hollow longitudinally-extending wheel spindles having their inner ends rigidly attached within said sockets and their outer ends projecting beyond the sockets to receive wheel bearings, a compensating gear housing above and detachably attached to the drop portion of the axle by vertically arranged sockets, driving wheels journaled upon the hollow spindles, and separate shaft-sections of less diameter throughout their length than the internal diameter of said hollow spindles to permit them to be attached and removed through said spindles, the ends of the shaft sections detachably connecting the wheel hubs and the compensating gearing, substantially as described.

In testimony whereof we affix our signatures in presence of two witnesses.

ALEXANDER WINTON.
HAROLD B. ANDERSON.

Witnesses:
P. T. Opper,
H. L. Oursney.